Dec. 6, 1966   R. H. CHAMPION   3,289,696
TAMPER-PROOF CONTROL FOR A BY-PASS TYPE METER BAR
Filed April 14, 1964   3 Sheets-Sheet 2

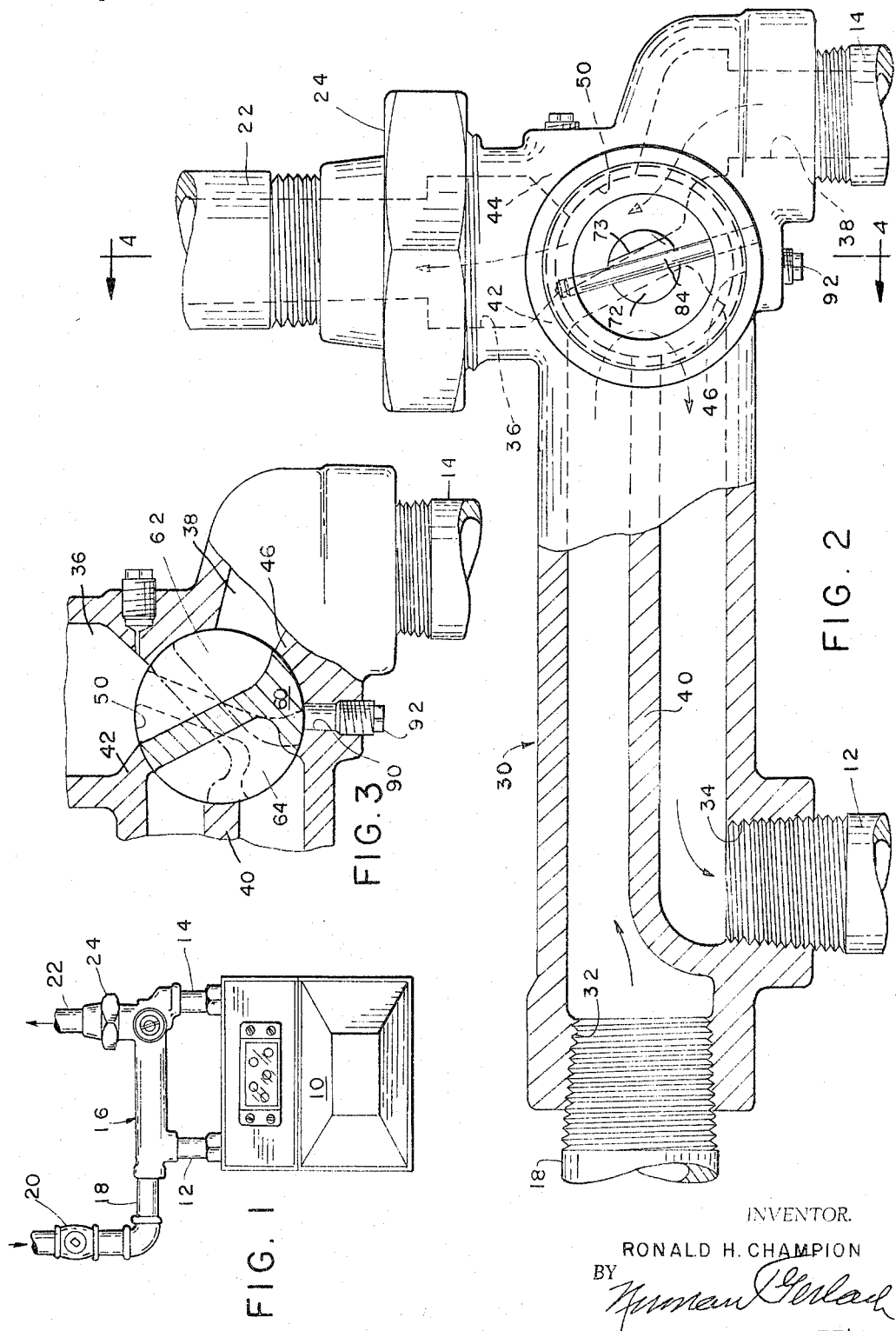

INVENTOR.
RONALD H. CHAMPION
BY
ATT'Y

Dec. 6, 1966    R. H. CHAMPION    3,289,696
TAMPER-PROOF CONTROL FOR A BY-PASS TYPE METER BAR
Filed April 14, 1964    3 Sheets-Sheet 3
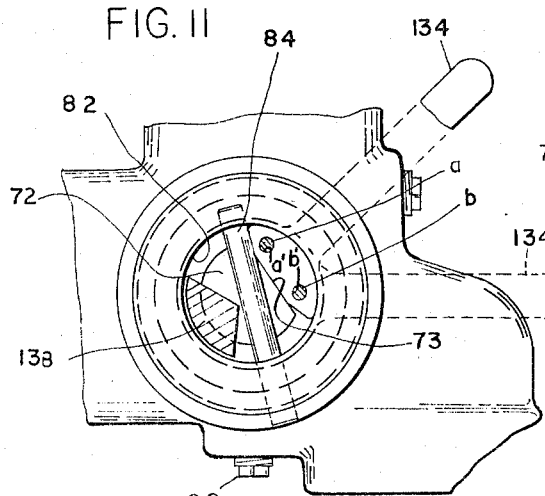
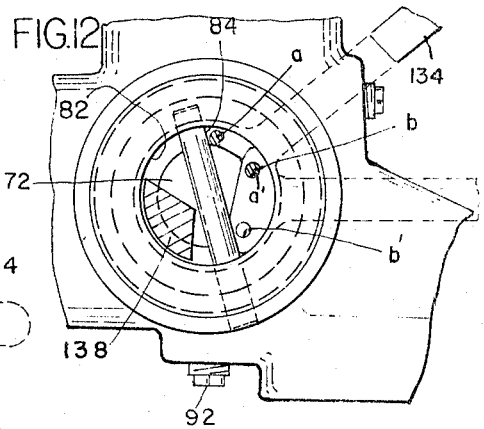
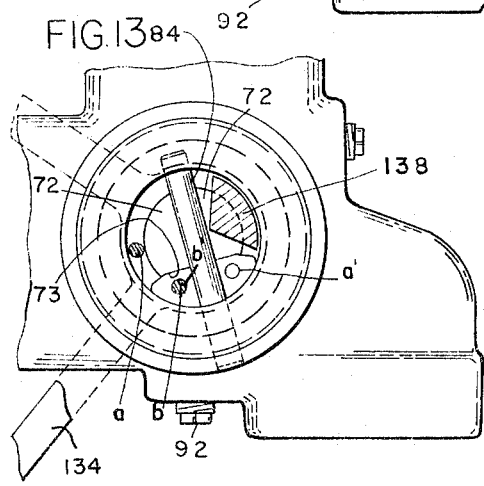
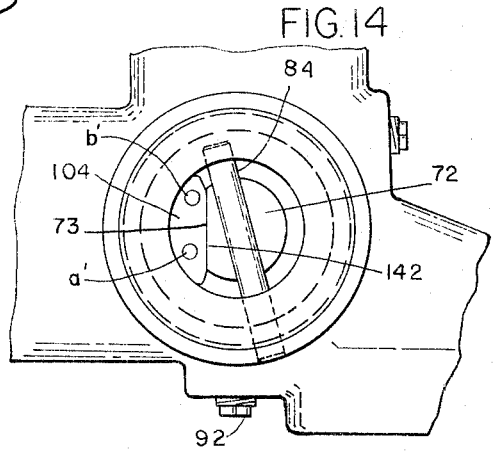
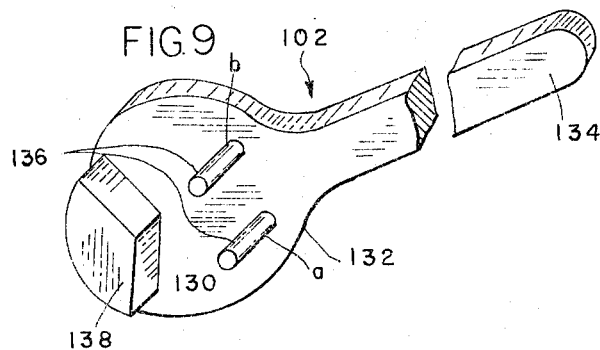
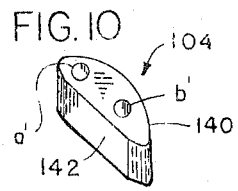
INVENTOR:
RONALD H. CHAMPION
BY
ATT'Y United States Patent Office 3,289,696
Patented Dec. 6, 1966

3,289,696
TAMPER-PROOF CONTROL FOR A BY-PASS TYPE METER BAR
Ronald H. Champion, Rockford, Ill., assignor to Eclipse Fuel Engineering Co., Rockford, Ill., a corporation of Illinois
Filed Apr. 14, 1964, Ser. No. 359,586
8 Claims. (Cl. 137—599.1)

The present invention relates to that type of gas meter bar wherein provision is made for effecting meter change-over operations without interruption to service. The invention is concerned specifically with the particular type of meter bar which is shown and described in my copending United States patent application Serial No. 337,008, filed on January 10, 1964 and entitled "By-pass Gas Meter Bar and Key Actuator Therefor," now Patent Number 3,238,969.

In my aforementioned copending patent application there is shown and described a by-pass meter bar which employs for its operation a single rotary valve plug, the latter being inherently incorporated in the meter bar and capable of movement between four functional positions, namely, a first position wherein full gas is supplied from the gas main to the household service pipe through the associated gas meter; a second position wherein fuel gas is supplied from the gas main directly to the service pipe, thus by-passing the meter so that meter change-over operations may be resorted to without gas service interruption; a third position wherein a newly installed meter may be purged of air; and a fourth or shut-off position wherein the flow of gas from the gas main to the service pipe is effectively blocked. Associated with such meter bar is a tamper-proof feature which embodies a special tool or wrench by means of which the rotary valve plug, to the exclusion of other wrenches or tools, may be turned between the various positions of which it is capable of assuming. The present invention affords a novel and improved tamper-proof control for manipulating the rotary valve plug of a meter bar of the type set forth in my above-mentioned patent application and, with suitable modifications, the tamper-proof control the present invention may be adapted for use in connection with the manipulation of a rotary valve plug that is associated with a directional valve other than a gas meter bar valve. Irrespective, however, of the particular use to which the invention may be put, the essential features thereof are at all times preserved.

It is an object of the present invention to provide a tamper-proof control for a by-pass meter bar of the type that is set forth in my copending patent application Serial No. 337,008 and has a rotary valve plug which is capable of assuming metering, by-pass and purge positions as outlined, the control providing a manipulating tool including a self-contained indicator which, when the tool is operatively applied to the meter bar, renders an indication of the position of the rotary valve plug. By such an arrangement it is unnecessary to provide special markings on the meter bar body.

A further object of the invention is to provide such a tamper-proof control embodying the use of a second manipulating tool by means of which the rotary valve plug may be shifted to a shut-off position, the second manipulating tool having associated therewith an auxiliary or counterpart operating element which is essential to its proper operation. By such an arrangement it is impossible for an operator, whose duty is simply to effect a meter change, inadvertently to effect a meter shut-off operation, thereby necessitating pilot relighting and other inconveniences associated with shut-off of the associated gas meter.

With these and other objects in view, which will become readily apparent as the following description ensues, the invention consists in the novel construction, combination and arrangement of parts shown in the accompanying three sheets of drawings forming a part of this specification.

In these drawings:

FIG. 1 is a front elevational view of a gas meter installation including a by-pass meter bar embodying the principles of the present invention;

FIG. 2 is an enlarged side elevational view of the meter bar with a portion of the body casting thereof broken away, the rotary valve plug being shown in its metering position;

FIG. 3 is a fragmentary sectional view taken through the meter bar in the vicinity of the valve plug and showing the latter in its normal metering position;

FIG. 9 is a perspective view of a second valve-manipulating tool which is employed in connection with the present invention and serves as a medium for shifting the valve plug between its metering and its shut-off positions;

Figure 4:
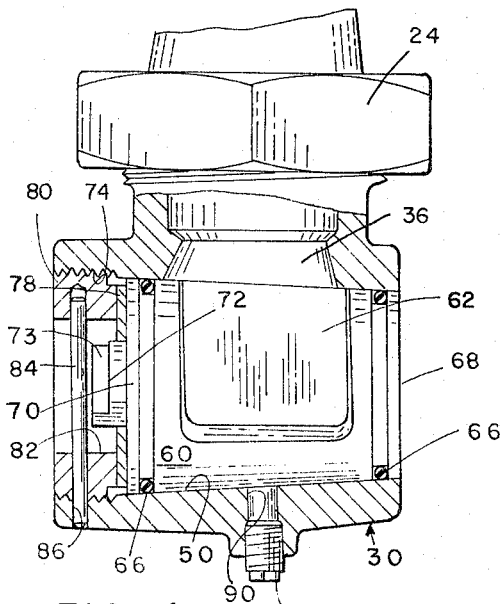
FIG. 4 is a sectional view taken substantially on the line 4—4 of FIG. 3.

FIG. 10 is a perspective view of a counterpart operating segment that is employed in connection with the use of the valve-manipulating tool of FIG. 9; and FIGS. 11, 12, 13 and 14 are fragmentary side elevational views, similar to FIG. 2, but illustrating schematically the manner in which the valve-manipulating tool of FIG. 9 and the operating segment of FIG. 10 are employed for valve-shifting purposes.

A gas meter installation embodying the by-pass gas meter bar of the present invention is illustrated in FIG. 1 wherein a conventional gas meter 10 is provided with a gas inlet connection 12 and a gas outlet connection 14. The meter is suspended by means of a meter bar 16 which, in turn, is supported by a fuel gas supply pipe 18 and a gas service pipe 22. The supply pipe 18 has a conventional shut-off cock 20 interposed therein, and the gas service pipe 22 communicates with and is connected to the meter bar by way of a suitable sleeve-like fitting 24.

As best shown in FIGS. 2 and 3, the by-pass meter bar 16 is in the form of an assembly of parts including a hollow casting 30 of horizontally elongated design. The external configuration of such casting is somewhat similar to the external configuration of a conventional solid meter bar of the type that is commonly employed in present-day practice by all public utility companies. The casting 30 is formed with an axial or laterally extending female gas supply inlet opening 32 and a depending or downwardly facing female gas outlet opening 34, the latter leading to the meter 10 through the gas inlet connection 12. The inlet opening 32 and the outlet opening 34 are disposed adjacent to one end of the meter bar casting 30. At the other end of the meter bar casting, there are provided an upwardly facing male gas outlet opening 36 and a depending or downwardly facing female gas inlet opening 38. The outlet opening 36 leads to the gas service pipe 22 and the gas inlet opening 38 is in communication with the meter 10 through the gas outlet connection 14.

An elongated horizontally extending internal partition-forming web 40 separates the inlet opening 32 from the outlet opening 34, while a short internal partition-forming web 42 similarly separates the inlet opening 32 from the outlet opening 36. The outlet opening 36 and the inlet opening 38 are separated by a short internal partition-forming web 44. Similarly, a web 46 separates the inlet opening 38 from the inlet opening 32. The elongated horizontally extending web 40 and the three short webs 42, 44 and 46 converge in radial fashion adjacent to the right hand end of the meter bar casting, each web terminating at the circumference of a generally cylindrical but slightly rearwardly tapered open-ended valve chamber 50. The chamber 50 extends horizontally and transversely through the casting 30. It is of frusto-conical design and possesses a small slant angle and a short slant height, the latter being commensurate with the transverse width of the meter bar in the valve region thereof.

A valve plug 60 (see FIG. 4) is rotatably disposed within the valve chamber 50 and is generally in the form of a tapered cylindrical body or spool having formed therein two pocket-like depressions or relief areas which constitute, in effect, valve passages 62 and 64 in the plug. The end regions of the valve plug 60 are sealed to the end regions of the valve chamber by elastomeric O-rings 66. The rear circular end face 68 of the valve plug 60 is exposed at the small base region of the frusto-conical chamber. The front face 70 of the valve plug is formed with an integral D-shaped protuberance 72. The latter has a flat side 73 and is designed to receive thereover a socket which is associated with a manipulating tool as will be described in greater detail presently.

Still referring to FIG. 4, the front end or large base region of the frusto-conical valve chamber 50 is provided with an internal screw thread 74 and the D-shaped protuberance 72 on the front face of the valve plug projects axially into this threaded area and is surrounded by a thrust washer 78. The latter is held in position by an externally threaded retaining ring 80 which coacts with the internal screw thread 74. The ring 80 is provided with a central opening 82 through which the protuberance 72 is accessible for turning movement when it is desired to rotate the valve plug 60 in either direction. A cross-pin 84 extends diametrically across the ring 80. It projects through the wall of the ring and has one end thereof extending into a hole 86 in the casting 30 at the rim region of the valve chamber 50. The cross-pin 84 prevents turning of the ring 80 and thus locks the latter in position. It also serves a functional purpose that will be made clear subsequently.

The casting 30, in addition to the openings 32, 34, 36 and 38, is provided with a small downwardly extending purge opening 90 in the form of a tapped hole which is normally sealed by a threaded plug 92.

Figure 8:
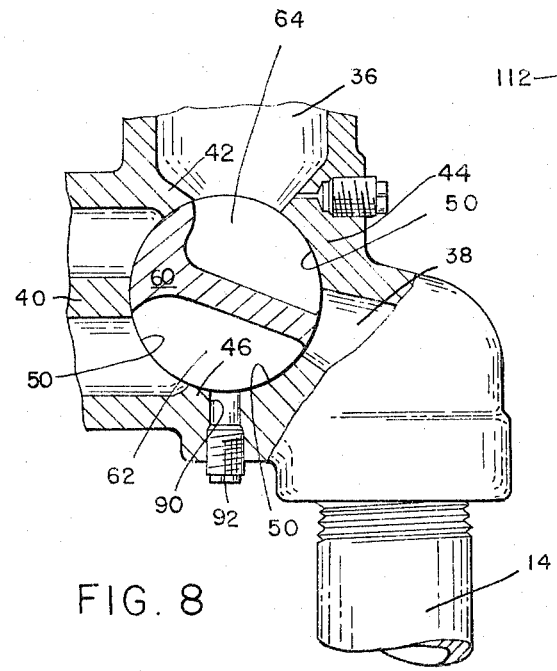
FIG. 8 is a sectional view similar to FIG. 3 but showing the valve plug in its shut-off position.

Referring now to FIGS. 3 and 8, the valve plug 60 is capable of movement between four functional positions including a first position wherein the valve passage 64 in the valve plug establishes communication between the gas supply inlet opening 32 and the outlet opening 34, while at the same time, the valve passage 62 establishes communication between the gas inlet opening 38 and the gas outlet opening 36. This position is shown in full lines in FIG. 3 and is referred to herein as the meter position inasmuch as it permits gas to flow from the gas main through the supply pipe 18, the inlet opening 32, the outlet opening 34, the meter 10, the inlet opening 38 and the outlet opening 36 to the service pipe 22.

What is termed herein as the purge position of the valve plug 60 is illustrated in dotted lines in FIG. 3. In such position of the valve plug, a small amount of gas is permitted to blend through the valve passage 64 and pass from the inlet opening 32 to the outlet opening 34, while at the same time the inlet opening 38 and the outlet opening 36 are out of communication, but the inlet opening is in communication with the purge opening 90. When this position of the valve plug 60 is employed, the plug 92 will be removed from the purge opening 90.

A third position of the valve plug 60, herein referred to as the by-pass position, is shown in broken lines in FIG. 3. In this position of the valve plug, the inlet opening 32 and the outlet opening 36 communicate with each other through the valve passage 64, while at the same time communication between the inlet opening 38 and the outlet opening 36 is prevented. Gas is thus available to the service pipe 22 while a meter is being changed but no gas may escape to the atmosphere from the meter bar casting 30.

A fourth position of the valve plug 60 is shown in FIG. 8 and is referred to herein as the shut-off position inasmuch as the valve plug effectively blocks off the gas inlet opening 32.

According to the present invention, manipulation of the valve plug 60 for effective positioning of the same in any one of its positions other than the shut-off position is accomplished only by the use of a special tool or valve actuator 100 (see FIGS. 5, 6 and 7), while movement of the valve plug to its shut-off position is accomplished only by the use of a special tool 102 (see FIG. 9) together with a counterpart operating segment 104 in associated relation therewith.

Figure 5:
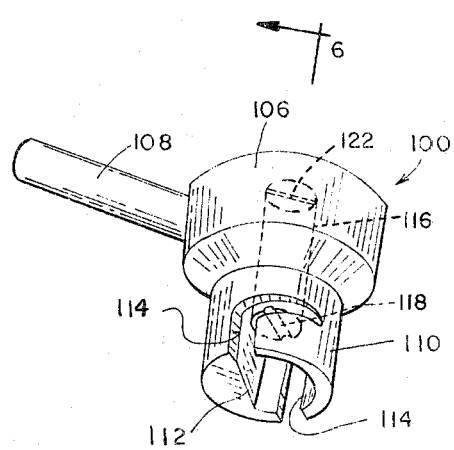
FIG. 5 is a perspective view of the valve-manipulating tool which is employed in connection with the present invention and serves as a medium for shifting the rotary valve plug between its metering and its purging positions.
Figure 6:
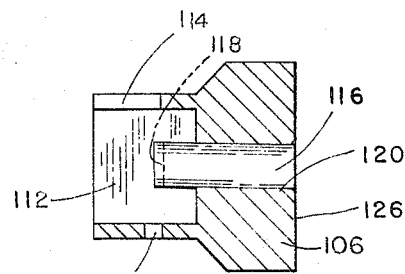
FIG. 6 is a sectional view taken on the line 6—6 of FIG. 5.
Figure 7:
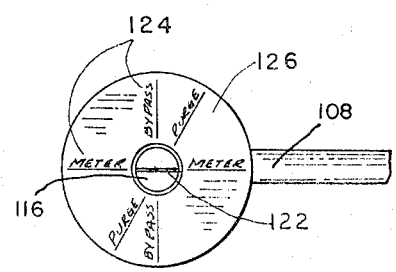
FIG. 7 is a plan view of the valve-manipulating tool of FIG. 5.

Referring now specifically to FIGS. 5, 6 and 7, the valve plug manipulating tool 100 is in the form of a cylindrical body 106 from which there projects radially an operating lever or handle 108. A cylindrical hub 110 projects forwardly of the body 106 and has formed therein a D-shaped socket 112 which is conformable in cross section to the cross section of the D-shaped protuberance 72 on the front face 70 of the valve plug 60. Bayonet slots 114 are formed in the wall of the socket 112 and are designed to receive and for cooperation with the cross-pin 84. Also designed for cooperation with the cross-pin 84 is an axial indicator stem 116 having a transverse groove 118 in one end thereof, that is, the end that is adjacent to the hub 110. The stem 116 is rotatable within a bore 120 in the cylindrical body 106 and the end thereof that is opposite the grooved end is provided with a diametric indicia line 122 which is in the form of a slot and is designed for selective register with various indicia legending 124 on the end circular face 126 of the tool body 106. The legending 124 is indicative of three of the four positions of which the valve plug 60 is capable of assuming.

In the operation of the tool 100, the cylindrical hub 110 is inserted into the central opening 82 of the threaded ring 80 so that the D-shaped socket 112 registers with and fits over the D-shaped protuberance 72, the cross-pin 84 entering the bayonet slots 114. It is to be noted at this point that only when the valve plug 60 is in its meter position may such insertion of the hub 110 into the opening 82 be effected. After the cross-pin 84 has become bottomed within the bayonet slots, the tool 100 may be rotated so that the cross-pin 84 will ride in the circumferentially extending portions of the bayonet slots. At the time of initial insertion of the hub 110 of the tool 100 into the opening 82, the groove 118 in the stem 116 will engage the cross-pin 84 and thereafter the stem 116 will be held stationary with the casting 30. Upon rotation of the tool 100, the stem will remain fixed and thus the indicia line 122 which is exposed on the circular end face 126 of the body 106 of the tool will indicate the position of the valve plug 60 in any given position of the tool. The innermost ends of the bayonet slots 114 will cooperate with the cross-pin 84 to limit the extent of turning movement of the tool, the extreme position of the tool resulting in the valve plug 60 being in its by-pass position. It is also to be noted at this point that, by reason of the limiting position of the tool as set forth above, the tool may not be employed to turn the valve plug 60 to its shut-off position. Finally, it is to be noted that the slot which comprises the indicia line 122 constitutes a means whereby the stem 116 may be restored to its initial position of registry with the meter position indicia in the event that it inadvertently moves out of calibration with this indicia when the tool is not in use.

When it is desired to turn the valve plug 60 to its shut-off position, the tool 102 of FIG. 9 and its counterpart operating segment 104 of FIG. 10 will be employed. Turning of the valve plug 60 from its normal meter position to its shut-off position has progressively been illustrated in FIGS. 11 to 14 inclusive. Movement of the valve plug 60 from its meter position to its shut-off position is accomplished by three successive manipulative movements of the tool 102 and its cooperating segment.

The total 102 is in the form of a flat paddle-shaped body 130 having a circular hub portion 132 and a radial handle 134. Two parallel pins 136, individually labeled $a$ and $b$, project outwardly from eccentric points on the circular hub portion 132. A combined guide and stop lug 138 also projects outwardly from the hub in the peripheral region thereof. The segment 104 is in the form of a small block-like member having an arcuate side 140 and a chordal side 142. Two holes 144, individually labeled $a'$ and $b'$, are formed in one end face of the segment.

In FIG. 11, the valve plug 60 is shown as being in its metering position and the flat side 73 of the protuberance 72 is unobstructed by the cross-pin 84 so that it is possible to insert the segment 104 within the central opening 82 in the ring 80 and so that it is positioned alongside the D-shaped protuberance with the flat or chordal side 142 thereof in contact with the flat side 73 of the protuberance. With the segment thus positioned as shown in FIG. 11, the operator will insert the pins $a$ and $b$ of the tool 102 into the holes $a'$ and $b'$ of the segment 104 as shown by the full line position of the handle 134 in this view. He will then shift the handle from its full line position in FIG. 11 to its dotted line position and, after such shifting has been completed, the pin $b$ will engage the cross-pin 84 to limit the movement of the handle and valve plug to an angular shift of approximately 40°. At this time, the position of the segment 104 will be as shown in FIG. 12, the segment having shifted to this position during the first step in the process.

The tool will then be removed and manipulated so that the pin $b$ will be inserted in the hole $a'$ while the hole $b'$ will be left empty. The pin $a$ will assume a position near the wall of the ring opening 82 as will the combined guide and stop lug 138. These elements, together with the segment 104 will exert reaction force against the ring opening 82 when the handle is swung in a clockwise direction as viewed in FIG. 12. With the handle 134 assuming the position wherein it is shown in full lines in this view, the second step in the valve-shifting process is to swing the handle to its dotted line position, whereupon the segment 104 will move to the position wherein it is shown in FIG. 13, the segment underlying the cross-pin 84 and the pin $b$ will again engage the cross-pin 84 and limit the movement of the handle and valve plug to an angular shift of approximately 60°.

The tool 102 will again be removed and the pin $a$ will then be inserted in the hole $b'$ while the pin $a$ will extend into the annulus existing between the D-shaped protuberance 72 and the wall of the ring opening 82, as shown in FIG. 13. The third step in the valve-shifting process is to swing the handle 134 in a clockwise direction from its full line position of FIG. 13 to its dotted line position whereupon, after the tool 102 has been removed, the segment 104 will assume the position wherein it is shown in FIG. 14. In this position of the segment, the valve plug 60 will be in its shut-off position. The protuberance 138 will engage the cross-pin 84 and limit the movement of the handle and valve plug to approximately 50°. Upon removal of the segment 104, valve shifting operations are complete and the valve plug has moved through an angle of approximately 150°.

Return of the valve plug 60 to its meter position is accomplished by a reversal of the three steps set forth above, followed, of course, by removal of the segment 104. An operator assigned to shut-off duty need not possess one of the tools 100 of FIG. 5, the only tool required of him being the tool 102 and its associated segment 104. Conversely, an operator assigned to meter replacement duty need not be equipped with one of the tools 102.

The invention is not to be limited to the exact arrangement of parts shown in the accompanying drawings or described in this specification as various changes in the details of construction may be resorted to without departing from the spirit or scope of the invention. Therefore, only insofar as the invention has particularly been pointed out in the accompanying claims is the same to be limited.

Having thus described the invention what I claim as new and desire to secure by Letters Patent is:

1. In a rotary spool-type directional valve assembly, in combination, a valve casing providing an internal valve chamber, a valve plug disposed within said valve chamber and capable of angular turning movement between first and second extreme positions, the wall of said valve casing having a circular opening therein in registry with the chamber and through which opening one end face of the valve plug is accessible for manipulation, a fixed cross pin extending diametrically across said circular opening in front of said end face of the valve, a rotary valve actuator for said valve plug having a cylindrical hub capable of endwise insertion in said circular opening, a non-circular protuberance on said end face of the valve plug, said cylindrical hub being formed with a cooperating and conformably non-circular socket therein receivable over said protuberance for transmitting torque from the valve actuator to the valve plug, the side wall of said socket being formed with diametrically disposed bayonet slots therein having axially extending portions in register with the cross pin when the non-circular protuberance and socket are in angular register, and having circumferentially extending portions conformable in arcuate extent to the extent of angular turning movement of which the valve plug is capable.

2. In a rotary spool-type directional valve, the combination set forth in claim 1 and including, additionally, an annular ring threadedly received within said circular opening, the wall of said opening being provided with a radial hole therethrough, said cross pin projecting diametrically across said annular ring and having one end thereof anchored in said hole whereby relative turning of the annular ring in the opening is prevented.

3. In a rotary spool-type directional valve, the combination set forth in claim 1 and wherein said non-circular protuberance and socket are of D-shape configuration in transverse cross section, each having a flat side and the flat sides thereof being designed for face-to-face contact when the socket is received over the protuberance.

4. In a rotary spool-type directional valve, the combination set forth in claim 1 and including, additionally, an annular ring threadedly received within said circular opening, the wall of said opening being provided with a radial hole therethrough, said cross pin projecting diametrically across said annular ring and having one end thereof anchored in said hole whereby relative turning of the annular ring in the opening is prevented, the non-circular protuberance and socket being of D-shape configuration in transverse cross section, each having a flat side and the flat sides thereof being designed for face-to-face contact when the socket is received over the protuberance.

5. In a rotary spool-type directional valve assembly, in combination, a valve casing providing an internal valve chamber, a valve plug disposed within said valve chamber and capable of angular turning movement between first and second extreme positions, the wall of said valve casing having a circular opening therein in registry with the valve chamber and through which opening one end face of the valve plug is accessible for manipulation, a fixed cross pin extending diametrically across said circular opening in front of said end face of the valve, a rotary valve actuator for said valve plug having a cylindrical hub capable of endwise insertion in said circular opening, a non-circular protuberance on said end face of the valve plug, said cylindrical hub being formed with a cooperating and non-circular socket therein receivable over said protuberance for transmitting torque from the valve actuator to the valve plug, the side wall of said socket being formed with diametrically disposed bayonet slots therein having axially extending portions in register with the cross pin when the non-circular protuberance and socket are in angular register, and having circumferentially extending portions conformable in arcuate extent to the extent of angular turning movement of which the valve plug is capable, the bottom wall of said socket being formed with a cylindrical bore therein, an indicating stem rotatable in said bore and projecting axially into the socket, interengaging means on the inner end face of the stem and cross pin for maintaining the stem stationary during angular turning movement of the valve actuator, and cooperating indicia on the stem and bottom wall of the socket for indicating the angular position of the stem with respect to the socket.

6. In a rotary spool-type directional valve assembly, the combination set forth in claim 5 and wherein said interengaging means on the inner end face of the stem and cross pin comprises a diametrically extending pin-receiving groove in said end face.

7. In a rotary spool-type directional valve assembly, the combination set forth in claim 5 and wherein the indicia on said stem comprises a diametrically extending slot in the outer end face of the stem designed for reception therein of a screw driver for adjusting the position of the stem when the tool is removed from the valve assembly.

8. In a rotary spool-type directional valve assembly, in combination, a valve casing providing an internal valve chamber, a valve plug disposed within said valve chamber and capable of angular turning movement between first and second extreme positions, the wall of said valve casing having a circular opening therein in registry with the valve chamber and through which opening one end face of the valve plug is accessible for manipulation, a cross pin extending diametrically across said circular opening in front of said end face of the valve, a D-shaped protuberance on said end face of the valve plug centrally thereof and presenting a semi-cylindrical wall surface concentric with said circular opening and a flat chordal wall surface, a rotary valve actuator for rotating said valve plug progressively in stages, a counterpart operating segment for said actuator, said segment fitting removably within the space existing between said flat chordal wall surface and the internal wall of said circular opening and substantially filling the same, said segment being formed with a pair of circumferentially spaced holes therein, said actuator comprising a body portion provided with a radially extending operating handle, a pair of torque-applying pins on said body portion designed for selective reception in said holes in the operating segment, and a combined guide and stop lug on said body portion of the actuator designed for selective reception in said circular opening on opposite sides of the cross pin in accordance with the selective reception of said torque pins in said holes, said torque pins and combined guide and stop lug being designed for engagement with said cross pin to limit the extent of rotary movement of the rotary actuator and segment during successive stages of rotation thereof.

No references cited.

M. CARY NELSON, *Primary Examiner.*

R. C. MILLER, *Examiner.*